United States Patent
Tsuboi et al.

(10) Patent No.: US 12,035,041 B2
(45) Date of Patent: Jul. 9, 2024

(54) SYSTEM AND EDGE DEVICE

(71) Applicant: CANON KABUSHIKI KAISHA, Tokyo (JP)

(72) Inventors: Toshiki Tsuboi, Tokyo (JP); Yuta Okabe, Tokyo (JP); Takeru Ohya, Tokyo (JP); Satoru Shingai, Tokyo (JP); Shoji Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 17/207,112

(22) Filed: Mar. 19, 2021

(65) Prior Publication Data

US 2021/0306547 A1    Sep. 30, 2021

(30) Foreign Application Priority Data

Mar. 24, 2020   (JP) .................................. 2020-052544
Jan. 22, 2021   (JP) .................................. 2021-008444

(51) Int. Cl.
  *H04N 23/66*   (2023.01)
  *G06N 20/00*   (2019.01)
  *H04N 7/18*    (2006.01)
  *H04N 23/62*   (2023.01)

(52) U.S. Cl.
  CPC .............. *H04N 23/66* (2023.01); *G06N 20/00* (2019.01); *H04N 7/18* (2013.01); *H04N 23/62* (2023.01)

(58) Field of Classification Search
  None
  See application file for complete search history.

(56) References Cited

U.S. PATENT DOCUMENTS

| | | | |
|---|---|---|---|
| 2010/0201806 A1* | 8/2010 | Nygaard ............ | G01B 11/2433 |
| | | | 356/243.1 |
| 2013/0050517 A1 | 2/2013 | Fan et al. | |
| 2016/0284095 A1* | 9/2016 | Chalom ............. | H04N 5/23229 |
| 2017/0206464 A1 | 7/2017 | Clayton et al. | |
| 2018/0211373 A1* | 7/2018 | Stoppa ...................... | G06T 7/55 |
| 2019/0278640 A1 | 9/2019 | Khare et al. | |
| 2020/0372625 A1* | 11/2020 | Dal Mutto ................ | G06T 7/50 |
| 2022/0155238 A1* | 5/2022 | Shibata .............. | G01N 21/8806 |

FOREIGN PATENT DOCUMENTS

JP      2020013220 A   1/2020

* cited by examiner

Primary Examiner — Samira Monshi
(74) Attorney, Agent, or Firm — Canon U.S.A., Inc. IP Division (57) ABSTRACT

A system includes one or more edge devices an integrated management apparatus configured to manage the one or more edge devices. The edge devices include a photodetector. The integrated management apparatus manages a first trained model and a first condition in association with each other. The first condition sets a condition for a photodetector used in generating the first trained model. The integrated management apparatus is configured to deliver the first trained model and the first condition to the edge devices.

15 Claims, 11 Drawing Sheets

SYSTEM AND EDGE DEVICE

BACKGROUND OF THE INVENTION

Field of the Invention

The present disclosure relates to a system and an edge device.

Description of the Related Art

Image recognition and classification processing using machine learning and deep learning are used in various technical fields. United States Patent Application Publication No. 2019/0278640 discusses a repository service for managing algorithm data (a trained model) for machine learning in a container and delivering the algorithm data.

In a management system described in United States Patent Application Publication No. 2019/0278640, operation of machine learning is made easy by providing a repository service for the machine learning. However, in a case where one or more edge devices, each including a photodetector, are used, conditions set in the respective edge devices can vary. Taking account of delivery of data to the edge device, there is a possibility that expected inference accuracy cannot be achieved because of the varying conditions set in the respective edge devices.

SUMMARY OF THE INVENTION

An aspect of the present disclosure is to improve inference accuracy in an edge device. In an embodiment, a system includes one or more edge devices an integrated management apparatus configured to manage the one or more edge devices. The edge devices include a photodetector. The integrated management apparatus manages a first trained model and a first condition in association with each other. The first condition sets a condition for a photodetector used in generating the first trained model. The integrated management apparatus is configured to deliver the first trained model and the first condition to the edge devices.

Further features of the present disclosure will become apparent from the following description of exemplary embodiments with reference to the attached drawings.

DESCRIPTION OF THE EMBODIMENTS

Exemplary embodiments described below are intended to embody the technical idea of the present disclosure and not to limit the present invention. The sizes of members illustrated in the drawings and the positional relationships therebetween may be exaggerated to clarify the description. In the following descriptions, identical configurations are assigned identical reference numerals, and a repeated description thereof will be omitted.

In the following descriptions, in a case where a description applies to similar configurations, a suffix such as a or b to the reference numeral will be omitted.

First Exemplary Embodiment

An edge device management system (hereinafter referred to as a system) according to a first exemplary embodiment will be described with reference to FIGS. 1 to 4 and FIGS. 9 to 11.

Figure 1:
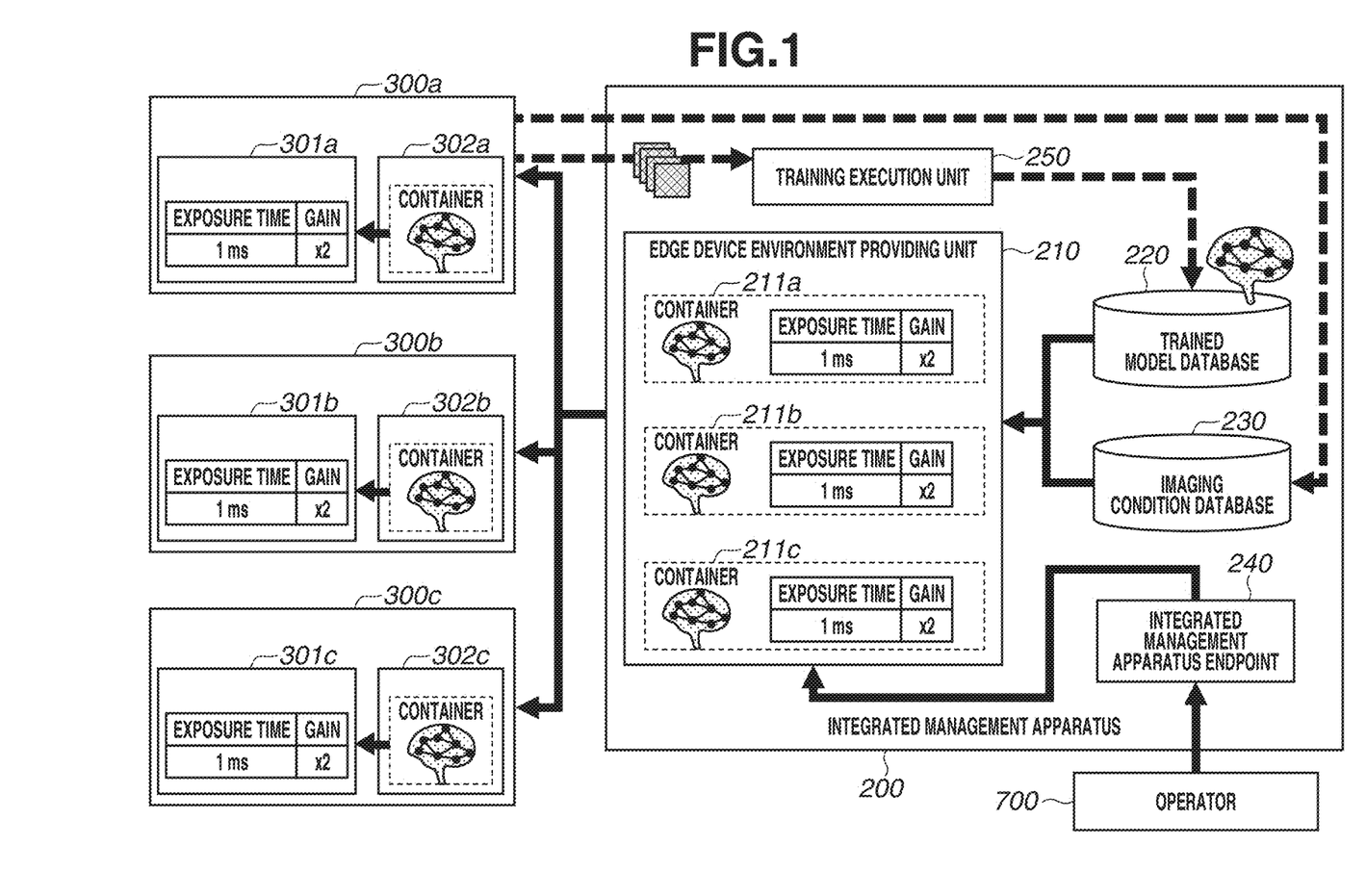
FIG. 1 is a block diagram illustrating an edge device management system according to a first exemplary embodiment.

FIG. 1 is a diagram illustrating a basic configuration of the system. The system includes one or more edge devices 300 and an integrated management apparatus 200. The edge device 300 and the integrated management apparatus 200 are connected so that a trained model managed by the integrated management apparatus 200 can be deployed to the edge device 300. The edge device 300 and the integrated management apparatus 200 may be disposed at physically separate locations as long as data such as a trained model can be deployed from the integrated management apparatus 200 to the edge device 300 using wireless communication or wired communication. For example, the edge device 300 may be disposed in a factory, and the integrated management apparatus 200 may be disposed in a management center at a remote location. Further, one of the edge device 300 and the integrated management apparatus 200 may be in one country, and the other may be in another country.

The system can be used, for example, as an inspection system. A case where the system is an inspection system will be described below. The systems according to the exemplary embodiments can be employed as various systems in addition to the inspection system, Examples of the various systems include an image recognition system for determining whether a specific piece of data is present in image data, and an automatic sorting system in a distribution center.

The system according to the present exemplary embodiment will be described below with reference to FIG. 1.
(Edge Device 300)

The edge device 300 includes a photodetector 301 and a computer 302. The computer 302 includes at least an input unit, a storage unit, and an output unit. Information about control of the photodetector 301 is transmitted from the integrated management apparatus 200 to the input unit of the computer 302.

For example, an image sensor, a photometric sensor, or a range-finding sensor can be used as the photodetector 301. A case where the photodetector 301 is an image sensor will be described below.

The computer 302 controls the photodetector 301. Further, the computer 302 can store a trained model delivered from the integrated management apparatus 200 in the storage unit. The computer 302 can also store a setting condition and obtained data in generating a training model in the storage unit. In FIG. 1, a trained model and an imaging condition are managed in a container in the integrated management apparatus 200, and the container is deployed to the computer 302. The computer 302 controls the photodetector 301 based on information in the container. The container is a virtually built "execution environment for a specific application". In the present exemplary embodiment, the container is an execution environment for performing imaging by the photodetector 301 and making an inference from trained data. Introducing the container enables the execution environment to be built quickly and easily and can reduce a load of environment management. Specifically, in a case where management using the container as in the present exemplary embodiment is not performed, since a plurality of applications is linked, if a specific application is updated, there is a possibility that a malfunction occurs in another application. Introducing the container can lower the possibility of occurrence of the malfunction and reduce the load of the management. In the following exemplary embodiments, the cases where the container is used will be described. However, a method other than the container may be used as long as the imaging condition and the trained model are managed in association with each other.

(Integrated Management Apparatus 200)

The integrated management apparatus 200 controls the one or more edge devices 300. In FIG. 1, the integrated management apparatus 200 controls the two or more edge devices 300. However, the number of edge devices 300 to be controlled may be one. The integrated management apparatus 200 includes at least an edge device environment providing unit 210. In FIG. 1, the integrated management apparatus 200 further includes a trained model database 220, an imaging condition database 230, an integrated management apparatus endpoint 240, and a training execution unit 250.

The trained model database 220 manages a plurality of trained models generated based on a plurality of imaging conditions, such as a first trained model generated for a first object (first work) based on a first imaging condition and a second trained model generated for the first work based on a second imaging condition. In other words, the trained model database 220 includes the first trained model and the second trained model generated for the "same work" based on different imaging conditions. Here, it is not necessary for the "same work" to be exactly the same work. For example, in a case where the work is a product A, a plurality of products A may correspond to the same work. Specifically, in a case where the product A is a red ink tank, one red ink tank may be used as the work, and another red ink tank of the same type may be used as the same work. The trained model database 220 may manage a third trained model generated for a second object (second work) based on the first imaging condition. In other words, the trained model database 220 may include a plurality of trained models generated by imaging the same object based on different imaging conditions, or may include a plurality of trained models generated by imaging different objects based on the same imaging conditions. Further, the trained model database 220 may include a plurality of trained models generated by imaging different objects based on different imaging conditions. Furthermore, the trained model database 220 may include all these types of trained models.

The imaging condition database 230 manages each imaging condition for generating a trained model to be managed by the trained model database 220. The integrated management apparatus 200 is configured to deliver a trained model and an imaging condition for generating the trained model.

The edge device environment providing unit 210 delivers the trained model and the imaging condition associated with each other to the edge device 300. In FIG. 1, the trained model and the imaging condition are managed in association with each other by a container 211, and the container 211 is deployed to the edge device 300. In other words, the container 211 manages the trained model and the imaging condition for imaging of the trained model in association with each other. For example, in FIG. 1, imaging is performed based on the same imaging condition for containers 211a to 211c. The imaging condition represents, for example, an exposure time and a gain. Specifically, an exposure time of 1 ms and a double gain are managed as the imaging condition in each of the containers 211a to 211c. The containers 211a to 211c may manage the trained models of the same work or may manage the trained models of different works as will be described in a second exemplary embodiment. The imaging condition can include various other conditions such as an International Standards Organization (ISO) sensitivity setting, an F-number setting, presence/absence of a high dynamic range, and a white balance adjustment. The imaging condition may be a condition of the photodetector 301 included in the edge device 300 managed by the integrated management apparatus 200, but is not limited thereto. For example, the trained model may be generated based on an image obtained by a photodetector included in an edge device not managed by the integrated management apparatus 200, and an imaging condition used in the generation and the trained model may be managed in the container.

Figure 9:
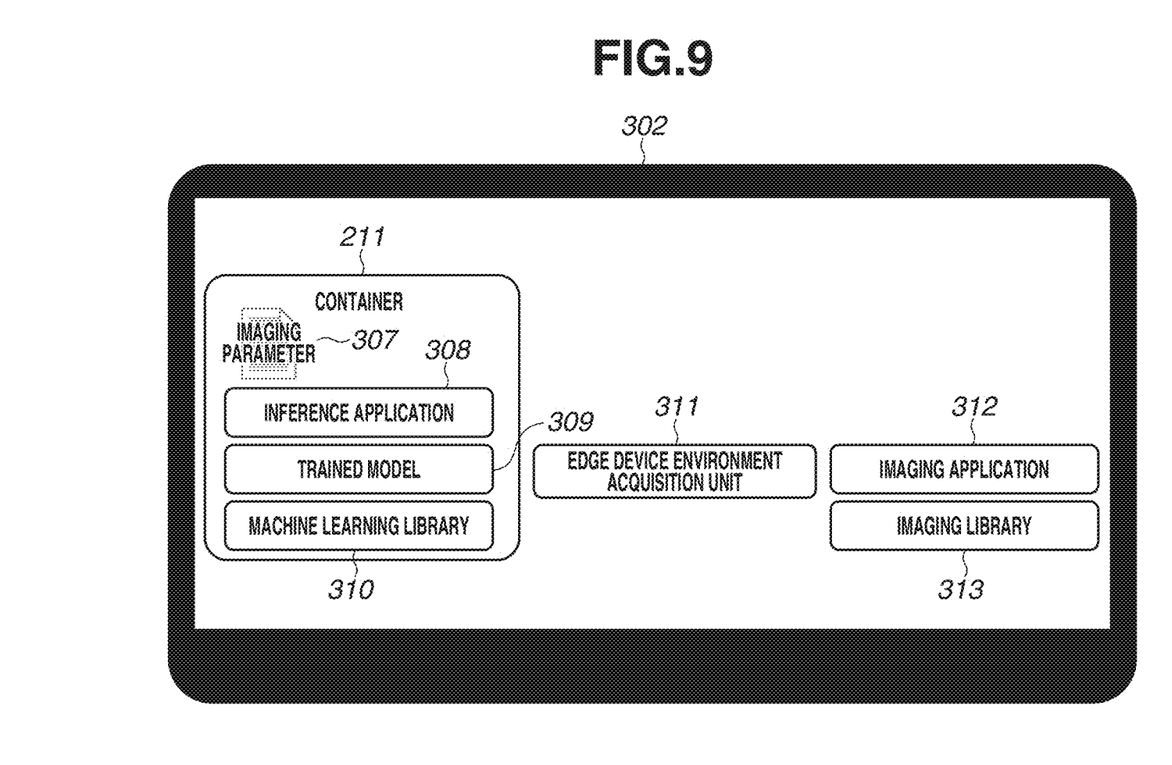
FIG. 9 is a diagram illustrating an example of the container according to the first exemplary embodiment.

As illustrated in FIG. 9, the container 211 may include, in addition to an imaging parameter 307 and a trained model 309, an inference application 308 and a machine learning library 310. When the container 211 is deployed to the computer 302, an edge device environment acquisition unit 311 acquires information such as an imaging condition, a firmware version, and installation information about the edge device 300 via an imaging application 312 and an imaging library 313. Subsequently, consistency is checked by referring to the imaging parameter 307 in the container 211, and then the container 211 is deployed.

Figure 11:
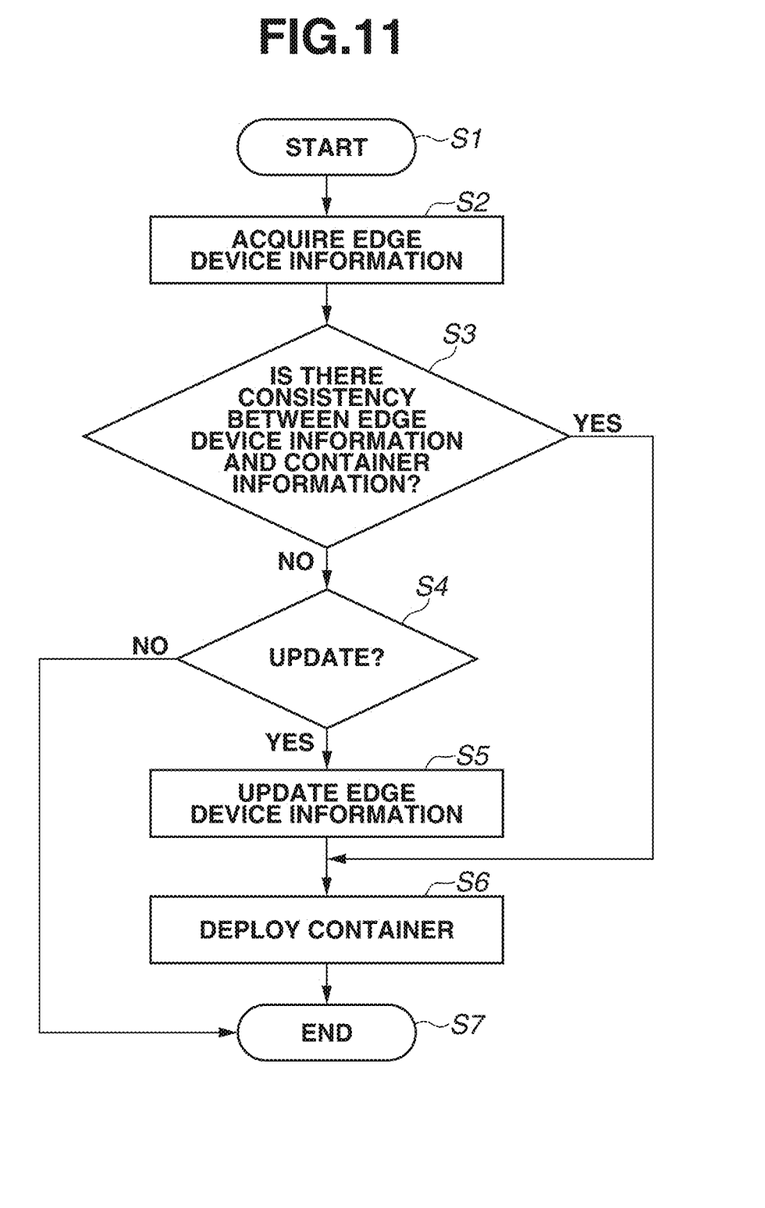
FIG. 11 is a flowchart illustrating an example of a procedure of deployment to an edge device according to the first exemplary embodiment.

In this process, even if there is inconsistency, the information about the edge device 300 can be overwritten in a procedure illustrated in FIG. 11 and be used.

FIG. 11 illustrates an example of a deployment procedure. In step S1, deployment of the container 211 to the computer 302 of the edge device 300 begins. In step S2, the integrated management apparatus 200 acquires the information about the edge device 300 via the edge device environment acquisition unit 311. Subsequently, in step S3, the integrated management apparatus 200 checks that there is consistency between the edge device information and the container information. The information includes the installation information, the library, and the firmware version of the edge device 300. If there is consistency (YES in step S3), the operation proceeds to step S6. In step S6, the container 211 is deployed. Then, in step S7, the procedure ends. If there is no consistency (NO in step S3), the operation proceeds to step S4. In step S4, whether to execute an update procedure for making the edge device 300 consistent with the container 211 is confirmed with an operator. If the operator does not agree with the execution (NO in step S4), the operation proceeds to step S7. In step S7, the procedure ends. If the operator agrees with the execution (YES in step S4), the operation proceeds to step S5. In step S5, the information about the edge device 300 is updated. The information can be automatically updated using an electronic medium or communication, or can be manually updated. In a case where the information is to be manually updated, for example, the operator is notified of the manual update so that the operator can issue an instruction. When updating the information about the edge device 300 is completed, the operation proceeds to step S6. In step S6, the container 211 is deployed to the edge device 300. Then, in step S7, the procedure ends.

Figure 10:
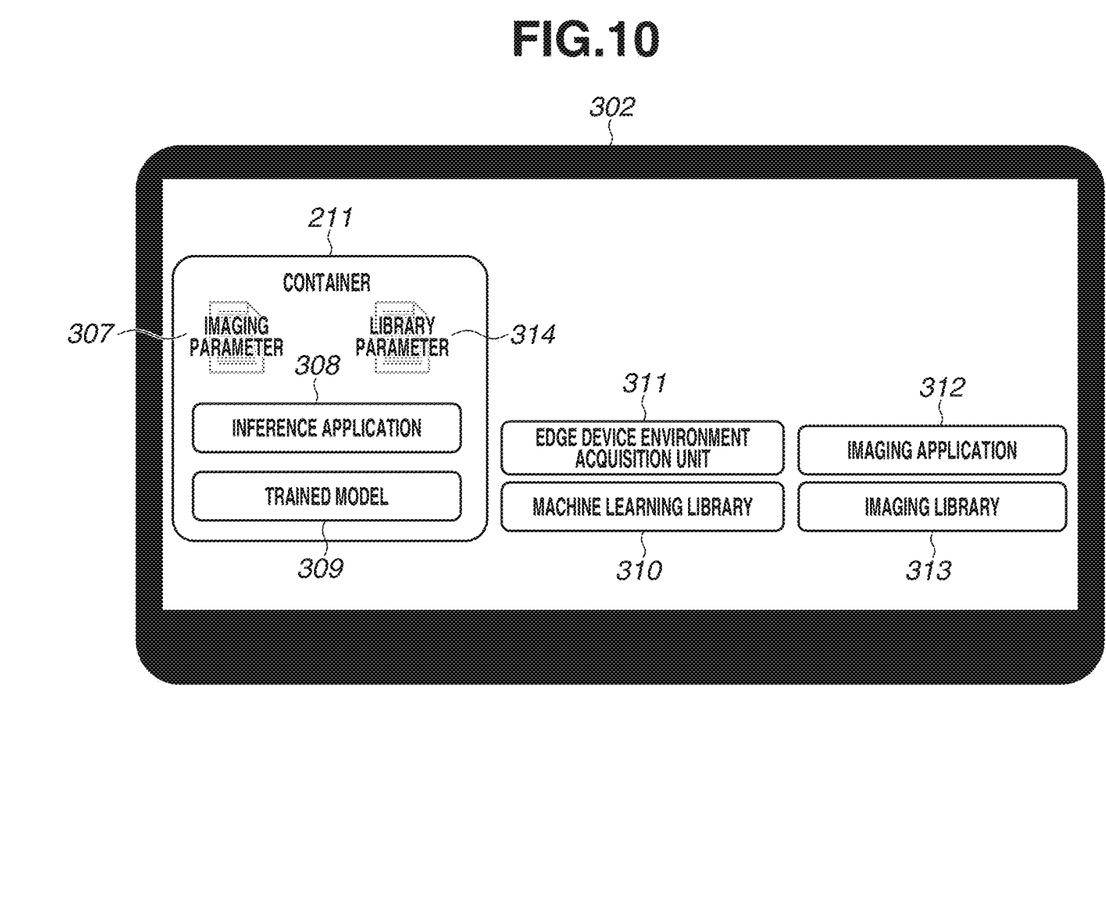
FIG. 10 is a diagram illustrating another example of the container according to the first exemplary embodiment.

The configuration of the container 211 can be a configuration not including the machine learning library 310 to be lightweight, as illustrated in FIG. 10. In other words, the container 211 includes the inference application 308 and the trained model 309, and the machine learning library 310 is outside the container 211, In this case, consistency between the machine learning library 310 and the inference application 308 or the trained model 309 is necessary, and a library parameter 314 is added for this purpose. A library parameter is usually smaller than the machine learning library 310 in terms of size, Thus, if the container 211 includes the library parameter 314 instead of including the machine learning library 310, the container 211 can be lightweight in comparison with the case where the machine learning library 310 is included.

In a case where the container information and the edge device information are not identical and thus there is inconsistency in deploying the container 211 to the edge device 300, similar container information or optimum container information may be selected and delivered.

When an operator 700 inputs information indicating a work to be inspected by each of the edge devices 300 into the integrated management apparatus endpoint 240 of the integrated management apparatus 200, the information indicating the work is transmitted from the integrated management apparatus endpoint 240 to the edge device environment providing unit 210, In other words, the operator 700 inputs information for changeover into the integrated management apparatus endpoint 240 of the integrated management apparatus 200. Subsequently, a trained model for the target work and an imaging condition used in generating the trained model are transmitted to the edge device environment providing unit 210 and are managed in association with each other in the container 211. Then, the target container 211 is delivered to the edge device 300 corresponding thereto. For example, in a case where the same work is to be inspected by the edge devices 300a, 300b, and 300c, the information about the container 211a is input into the computers 302a, 302b, and 302c. Alternatively, the container 211a may be delivered to the computer 302a, and the containers 211b and 211c managing the same information as that of the container 211a may be delivered to the computers 302b and 302c, respectively.

There is a possibility that inspection cannot be accurately performed by only inputting a trained model corresponding to a work to be inspected into the edge device 300, because of a difference between an edge device used to generate the trained model and an edge device to perform the inspection in terms of the setting condition such as an imaging condition. In the present exemplary embodiment, not only a trained model but also an imaging condition for imaging of the trained model are input from the integrated management apparatus 200 to the edge device 300. Thus, when a trained model is delivered to the edge device 300 to make an inference, imaging can be performed based on the same imaging condition as the imaging condition used in generating the trained model, so that the inference accuracy can be improved.

Figure 2A:
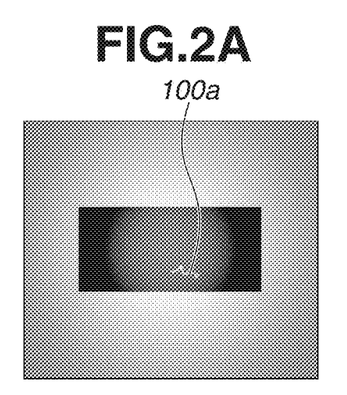
FIGS. 2A to 2F are diagrams illustrating the first exemplary embodiment and a comparative example.
Figure 2B:
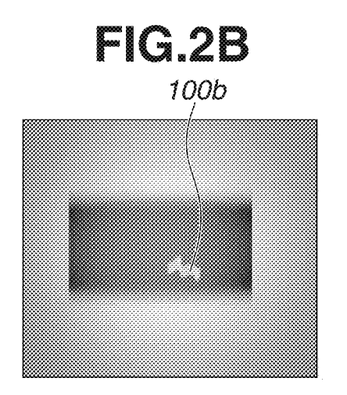
Figure 2C:
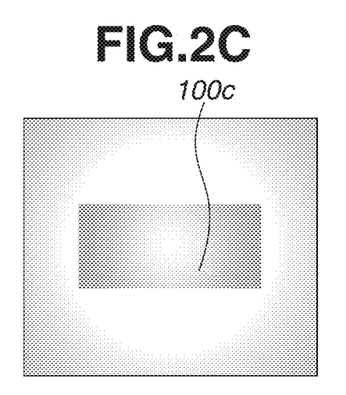
Figure 2D:
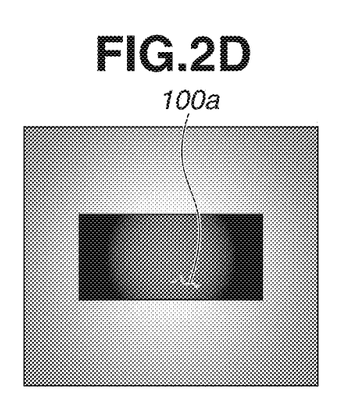
Figure 2E:
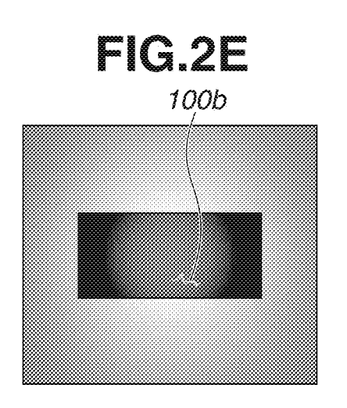
Figure 2F:
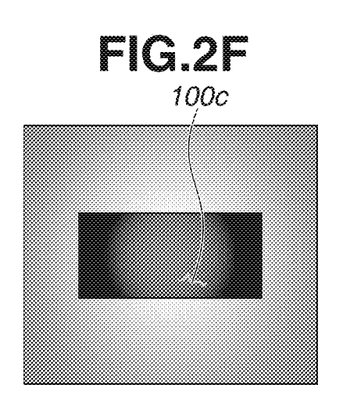

An effect of the present exemplary embodiment will be described with reference to FIGS. 2A to 2F. A work has a scratch 100, and a defect of the work is to be inspected. The work moves from top to bottom in each of FIGS. 2A to 2F. For example, FIG. 2A illustrates a result of imaging by the edge device 300a used to generate a trained model. FIG. 2B illustrates a result of imaging by the edge device 300b into which a trained model is input but an imaging condition is not input. FIG. 2C illustrates a result of imaging by the edge device 300c into which a trained model is input but an imaging condition is not input. FIGS. 2D, 2E, and 2F illustrate results of imaging by the edge device 300a, by the edge device 300b, and by the edge device 300c, respectively, into each of which a trained model and an imaging condition are input. In FIG. 2A, imaging is performed based on an appropriate condition, so that the scratch 100a of the work can be detected. However, in FIG. 2B, an exposure condition is not appropriate and thus imaging results in a blur, so that the scratch 100b cannot be precisely detected. In FIG. 2C, a gain is not appropriate and thus imaging results in overexposure, so that the scratch 100c cannot be detected. In contrast, as illustrated in each of FIGS. 2D to 2F, in the edge device 300 into which the trained model and the imaging condition are input, imaging is performed with accuracy, so that the scratch 100 can be precisely detected.

The optimum condition varies depending on a work. There will be described, for example, a case where an imaging condition used in generating a trained model is a condition A, and an imaging condition set as a standard condition is a condition B in FIG. 1. In this case, the edge device 300a has the trained model and the condition A used in generating the trained model, and thus can perform imaging based on the optimum condition. Meanwhile, in the edge device 300b, the imaging condition is the condition B, and thus the optimum condition cannot be obtained if only the trained model is input, so that inspection accuracy can decrease in comparison with the edge device 300a. In contrast, in the present exemplary embodiment, the optimum condition for inspection of a product and the trained model for a work are managed in association with each other, and both are input to the edge device 300. Thus, inspection accuracy equal to that of the edge device 300a can be achieved in each of the edge devices 300.

Next, an execution procedure, when a trained model, trained in the edge device 300a, is used in the other edge devices 300b and 300c, will be described with reference to FIGS. 1 and 3.

Figure 3:
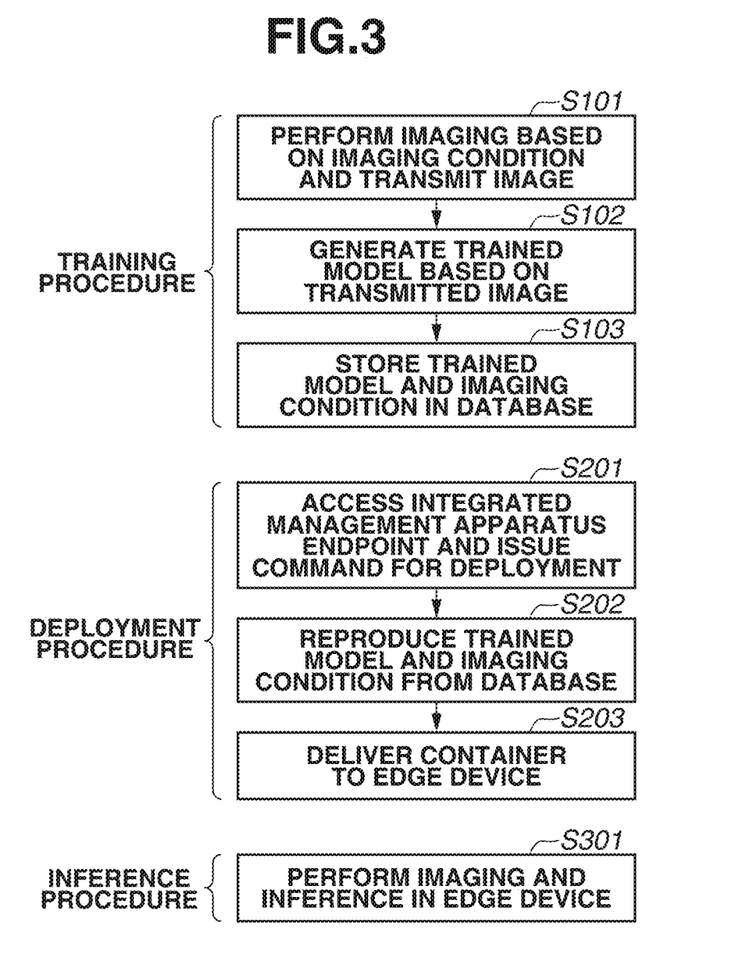
FIG. 3 is a flowchart illustrating operation according to the first exemplary embodiment.

As illustrated in FIG. 3, the execution procedure is divided into a training procedure and a deployment procedure.

First, the training procedure will be described. In step S101, a work is imaged based on a first condition (an imaging condition) using the photodetector 301a of the edge device 300a. The first condition is, for example, an exposure time of 1 ms and a double gain. The image obtained thereby is transmitted to the training execution unit 250 of the integrated management apparatus 200.

In step S102, training is executed using the transmitted image, and a trained model is generated. The trained model can be generated by machine learning. When the image of a work is input during inspection, the trained model makes determination as to the presence/absence of a defect and as to pass/fail, and outputs the result of the determination. In step S103, the trained model is stored in the trained model database 220. The first condition is also stored in the imaging condition database 230. In this process, the trained model database 220 and the imaging condition database 230 are associated with each other in a relational database or the like and managed in the edge device environment providing unit 210.

As a specific algorithm of machine learning, algorithms such as a nearest neighbor algorithm, a Naive Bayes algorithm, a decision tree, and support vector machines may be used. Further, deep learning that generates by itself a feature amount for training and a coupling weighting factor by utilizing a neural network may be used. For example, a convolutional neural network (CNN) model may be used as a model of the deep learning.

In a case where a plurality of trained models is to be generated, step S101 to step 103 described above are repeated with a different imaging condition and/or work.

Next, the deployment procedure will be described. First, in step S201, in order to deploy the trained model of the edge device 300a to the other edge devices 300b and 300c, the operator 700 accesses the integrated management apparatus endpoint 240 using a representational state transfer (REST) application programming interface (API) or the like to issue a command. Instead of the access by the operator 700, the deployment of the trained model of the edge device 300a to the other edge devices 300b and 300c can be set by programming. For example, the deployment may be performed every weekend based on a schedule set using a script or the like.

In step S202, in response to the command from the integrated management apparatus endpoint 240, the edge device environment providing unit 210 imports a set of a trained model suitable for the edge device 300 and an imaging condition into the container 211. In this process, the trained model is reproduced from the trained model database 220 and the imaging condition is reproduced from the imaging condition database 230 to be imported into the container 211. For the structure and orchestration of the container 211, a container orchestration system for performing deployment, scaling, and management of a containerized application can be used. As the container orchestration system, any type of structure may be used as long as similar operations can be executed.

A container for storing a trained model and an inference container may be managed as separate containers in association with each other.

Next, in step S203, the integrated management apparatus 200 delivers the containers 211a, 211b, and 211c to the edge devices 300a, 300b, and 300c, respectively.

Subsequently, in step S301, imaging is performed and an inference is made in each of the edge devices 300. In a case where predetermined inference accuracy is obtained in step S301, inspection is executed using a work to be inspected. In a case where the predetermined inference accuracy is not obtained in step S301, step S101 to step S301 are executed again with a different imaging condition, and step S101 to step S301 are executed until the predetermined inference accuracy is achieved.

The above-described execution procedure enables the trained model trained in the edge device 300a to be used in the other edge devices 300b and 300c.

Figure 4:
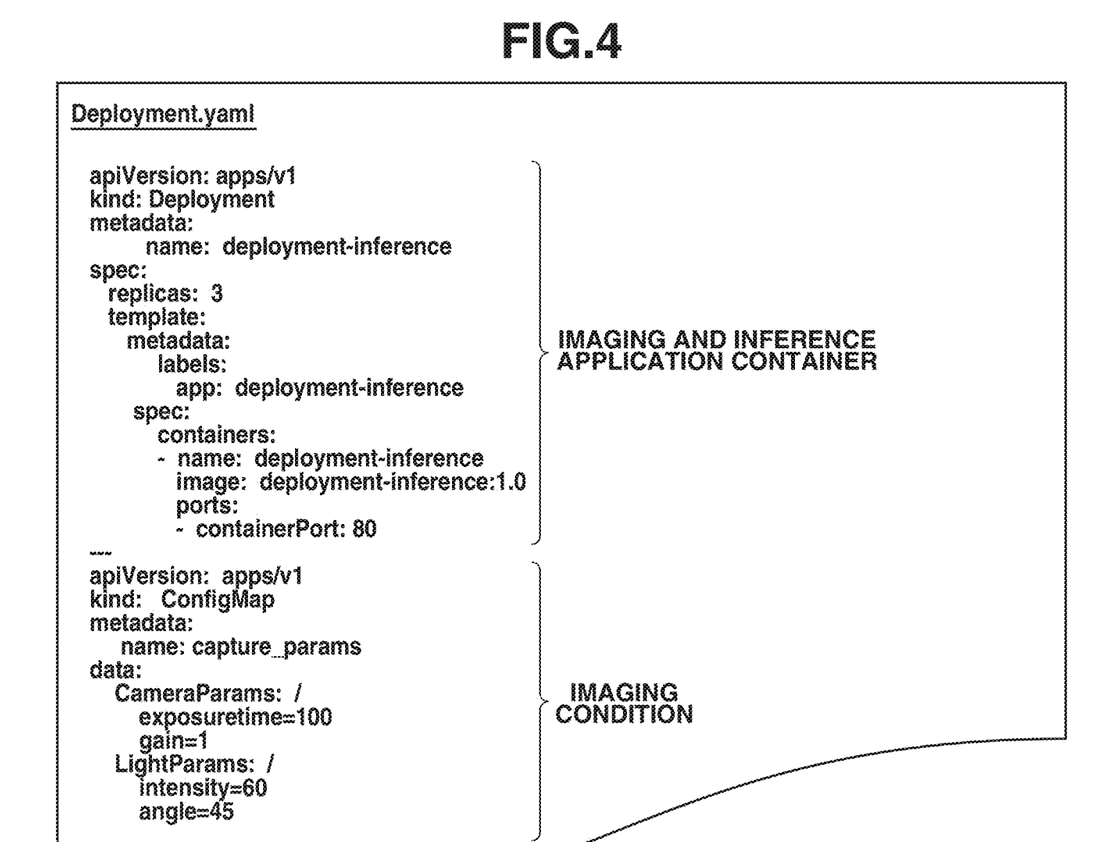
FIG. 4 illustrates an example of a container according to the first exemplary embodiment.
Figure 8:
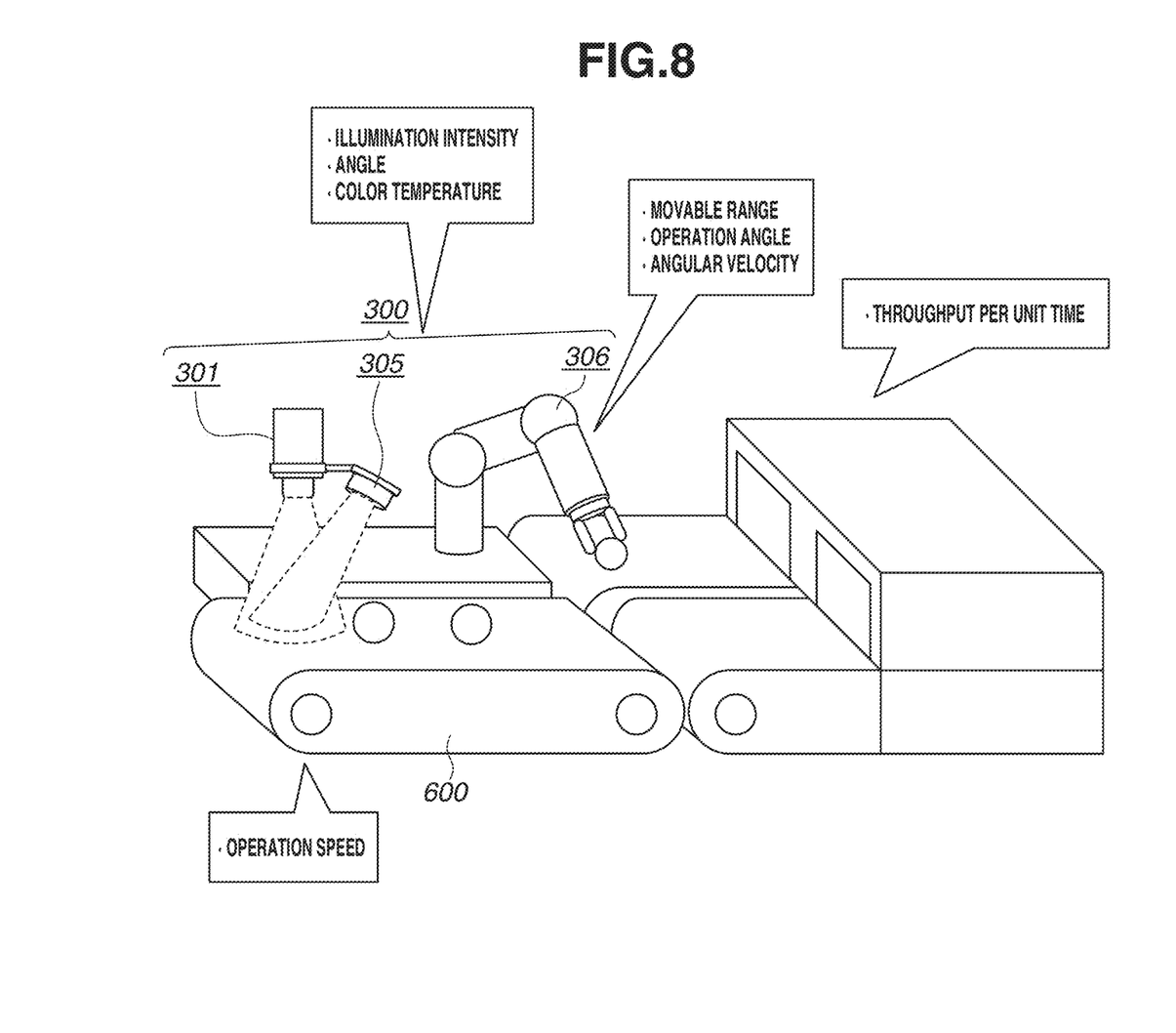
FIG. 8 is a conceptual diagram illustrating an application according to a fifth exemplary embodiment.

A case where an imaging condition and a trained model are integrally managed in a container is exemplified by, but not limited to, a container illustrated in FIG. 4. As illustrated in FIG. 4, a system administrator executes a Deployment.yaml file for managing an imaging condition and a trained model, via an API. Subsequently, the Deployment.yaml file is used and deployed to an edge device. Specifically, in FIG. 4, the imaging condition including an exposure time, a gain, an illumination intensity of an illumination device, and an angle of the illumination device and the trained model are managed in association with each other. Although the illumination device is not illustrated in FIG. 1, the angle and the illumination intensity are input into the illumination device included in the edge device, as illustrated in FIG. 8. Subsequently, the imaging condition and the trained model described above are input into the edge device, and an inference is made for a work.

In the above description, the container 211a is delivered also to the edge device 300a from the integrated management apparatus 200, but the delivery of the container 211a may be omitted because the edge device 300a is an edge device used in generating the trained model.

The example in which the trained model and the imaging condition are managed in the container and the container is delivered is described, but the trained model may be managed in the container and the imaging condition may be separately managed in association with the trained model in the container.

In the present exemplary embodiment, a trained model and a condition used in generating the trained model are managed in association with each other in the integrated management apparatus 200. The trained model and the condition are delivered to the edge device 300 to perform imaging and make an inference. The inference accuracy in the edge device 300 can be thereby increased. Moreover, a dead time before the start of trained inspection can be reduced in the inspection of a work.

Second Exemplary Embodiment

An edge device management system according to a second exemplary embodiment will be described with reference to FIG. 5. The system according to the second exemplary embodiment is different from the system according to the first exemplary embodiment in that a plurality of edge devices managed by an integrated management apparatus 200 includes an edge device that inspects a first work and an edge device that inspects a second work different from the first work. Configurations except for configurations described below are similar to those of the first exemplary embodiment, and thus the description thereof may be omitted.

Figure 5:
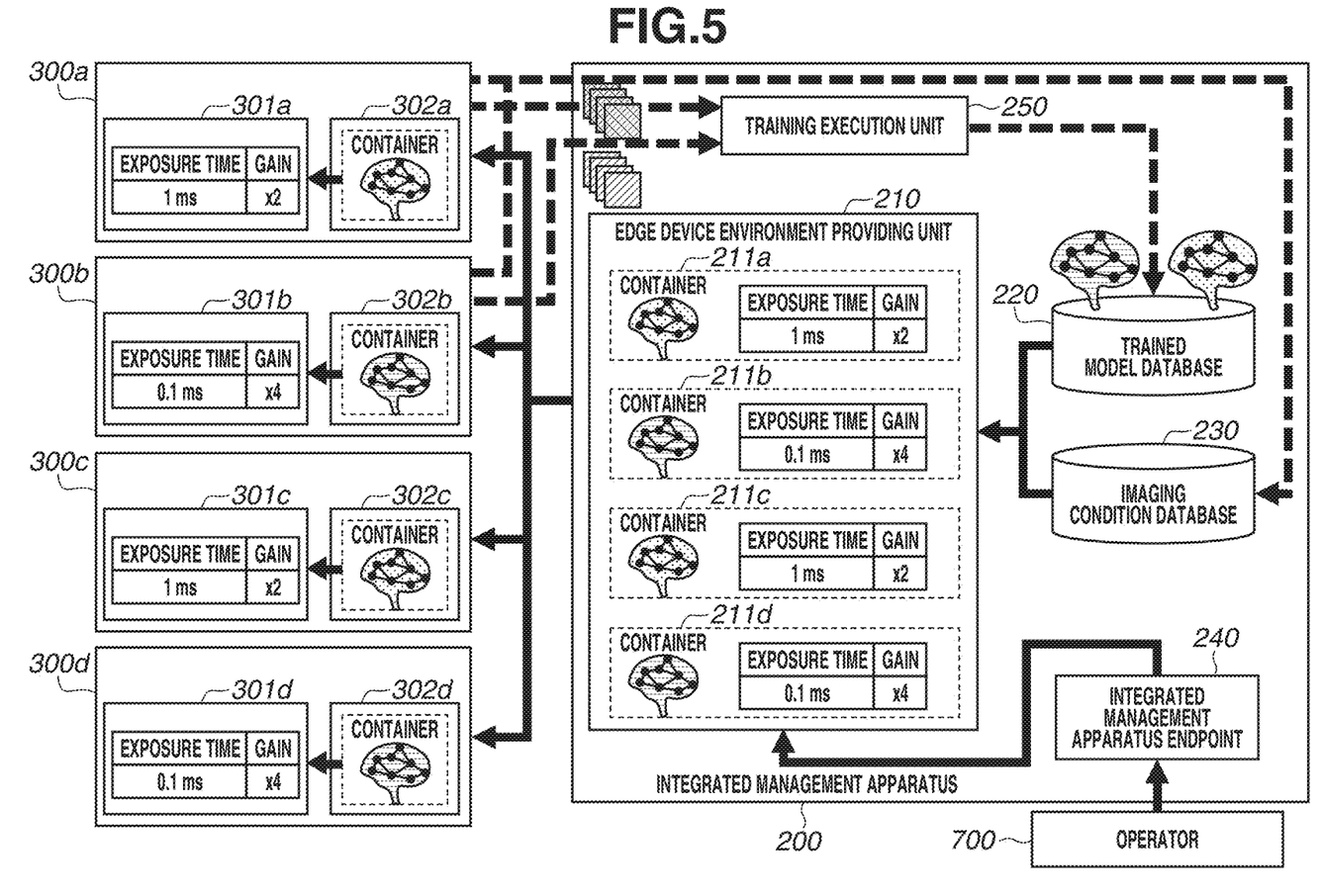
FIG. 5 is a block diagram illustrating an edge device management system according to a second exemplary embodiment.

As illustrated in FIG. 5, the integrated management apparatus 200 manages edge devices 300a and 300c that inspect a first work (a product A) and edge devices 300b and 300d that inspect a second work (a product B). A container suitable for the work to be imaged by the edge device is delivered to each of the edge devices 300. For example, in FIG. 5, containers 211a and 211c that each manage a trained model and an imaging condition corresponding to the first work are delivered to the edge devices 300a and 300c. Further, containers 211b and 211d that each manage a trained model and an imaging condition corresponding to the second work are delivered to the edge devices 300b and 300d.

The method of generating the trained model and the structure of the management of the trained model and the imaging condition are similar to those of the first exemplary embodiment and thus will not be described.

In the present exemplary embodiment, the time until a changeover is completed in a case where a product to be inspected by an edge device is changed can be reduced in comparison with a case where only a trained model is input. For example, there is a case where the product A is inspected by an edge device for a predetermined period and a product B is inspected by the same edge device for a predetermined period. Optimum imaging conditions vary among products, and thus it takes time for the imaging condition for an edge device to become the optimum imaging condition if only a trained model corresponding to the product to be inspected is input to the edge device. Thus, it takes time to complete the changeover each time the product to be inspected is changed. In contrast, in the present exemplary embodiment, since the trained model and the imaging condition are delivered to the edge device, the time until the optimum imaging condition is attained can be reduced, so that the inference accuracy can be increased. Moreover, each of the edge devices can inspect a different work Third Exemplary Embodiment An edge device management system according to a third exemplary embodiment will be described with reference to FIG. 6. The system according to the third exemplary embodiment is different from the system according to the second exemplary embodiment in that each of edge devices 300 includes a training execution unit 250. Configurations except for configurations described below are similar to those of the second exemplary embodiment, and thus the description thereof may be omitted.

Figure 6:
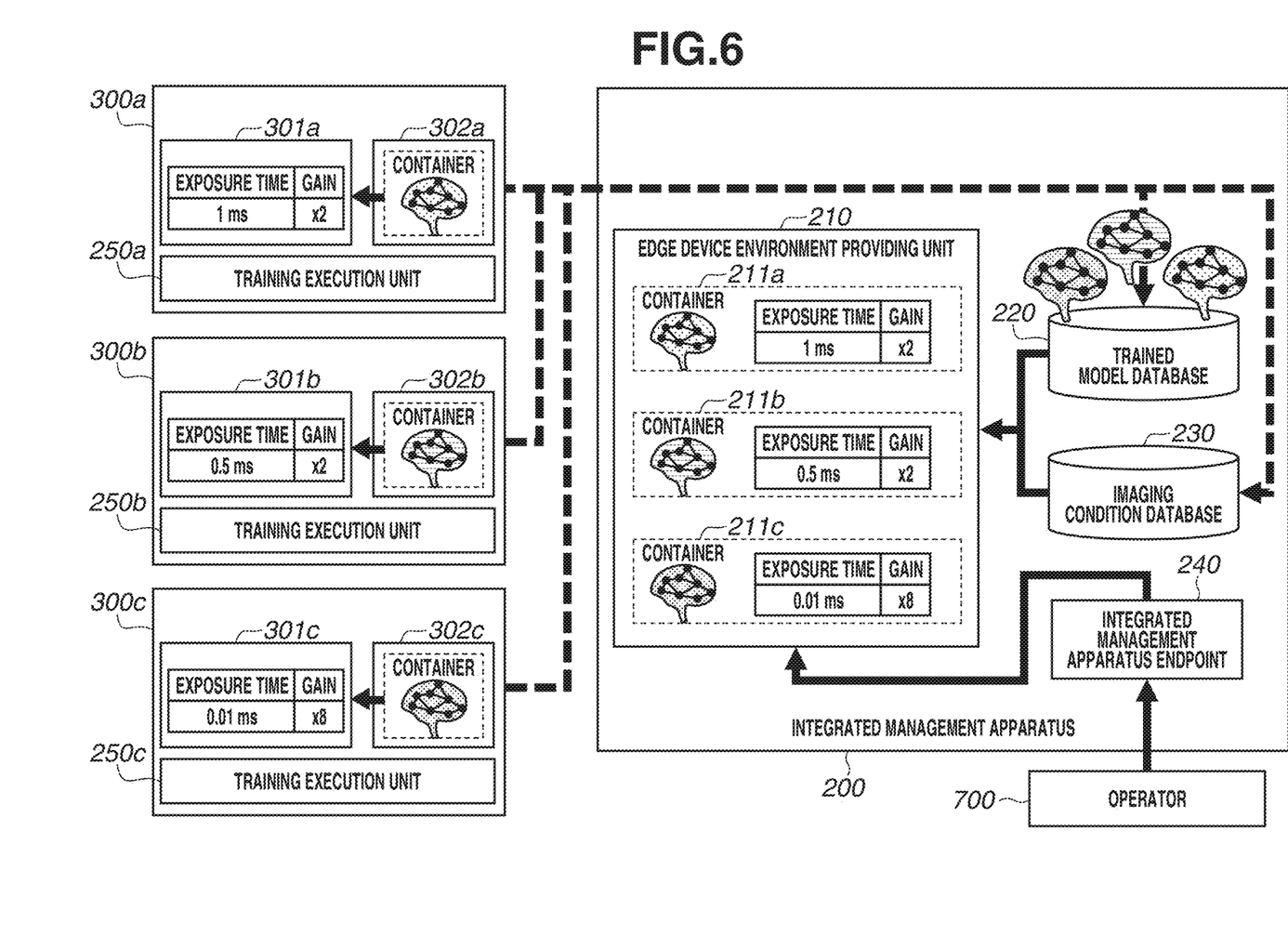
FIG. 6 is a block diagram illustrating an edge device management system according to a third exemplary embodiment.

In the system according to the third exemplary embodiment, the edge devices 300a, 300b, and 300c include the execution units 250a, 250b, and 250c, respectively. The training execution unit 250 included in the edge device 300 generates a trained model. Specifically, a trained model obtained from a photodetector 301 is input to the training execution unit 250, and a trained model is generated in the training execution unit 250.

Subsequently, the trained model generated in each of the edge devices 300 is input to a trained model database 220 and an imaging condition database 230 of an integrated management apparatus 200. The trained model of each of the plurality of edge devices 300 and the imaging condition used in generating the trained model are collectively managed in the integrated management apparatus 200.

An example of a procedure according to the present exemplary embodiment will be described below. First, an operator 700 provides an instruction about execution/non-execution of training in the training execution unit 250 and an update of a trained model, via an integrated management apparatus endpoint 240.

Next, an image obtained by imaging by a photodetector 301 of the edge device 300 is transmitted to the training execution unit 250, and training is executed.

A trained model of which training has progressed to some extent and predetermined accuracy is obtained is stored in the trained model database 220 of the integrated management apparatus 200. In this process, in a case where a trained model stored before the execution of the training is present, the trained model may be updated to the newly-generated trained model. The predetermined accuracy can be set as appropriate. The predetermined accuracy is, for example, accuracy with which a probability of pass in pass/fail determination is 80% or more in an inspection process.

At or around the same time as the trained model is stored in the trained model database 220, the imaging condition used in generating the stored trained model is also stored in the imaging condition database 230. Subsequently, the trained model database 220 and the imaging condition database 230 are managed in association with the corresponding trained model and the corresponding imaging condition, respectively.

In the present exemplary embodiment, the set of the trained model and the imaging condition are managed, and the trained model and the imaging condition are delivered to the edge device 300, so that the inference accuracy can be increased. In the present exemplary embodiment, the training execution unit 250 is included in each of the edge devices 300, and retraining is performed in the edge device 300, so that the accuracy of the trained model can also be increased.

Fourth Exemplary Embodiment

An edge device management system according to a fourth exemplary embodiment will be described with reference to FIG. 7. The system according to the fourth exemplary embodiment is different from the system according to the first exemplary embodiment as follows. In the system according to the fourth exemplary embodiment, data from a photodetector 301 is input from an edge device 300 into a training execution unit 250 via a pre-processing unit 303. Further, data is input from the training execution unit 250 into a trained model database 220 via a post-processing unit 304. Furthermore, data is input from the pre-processing unit 303b to a training execution unit 250b in an inference procedure. Configurations except for configurations described below are similar to those of the second exemplary embodiment, and thus the description thereof may be omitted.

Figure 7:
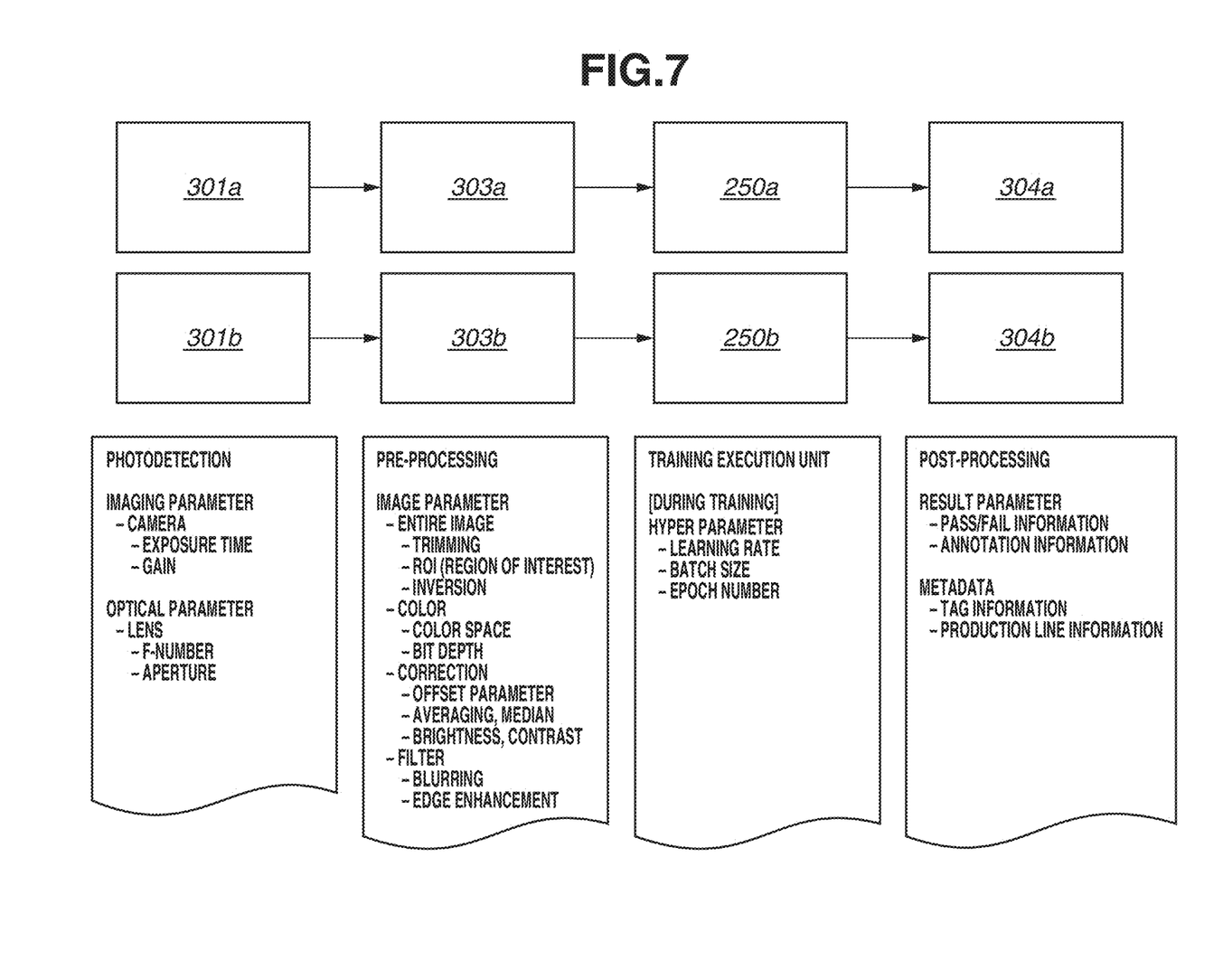
FIG. 7 is a block diagram illustrating an edge device management system according to a fourth exemplary embodiment.

In FIG. 7, the photodetector 301a to the post-processing unit 304a indicate a training procedure, and the photodetector 301b to the post-processing unit 304b indicate the inference procedure. The training procedure and the inference procedure are different in terms of configuration of receiving data input from the pre-processing unit 303.

The pre-processing unit 303 and the post-processing unit 304 may be included in an integrated management apparatus 200 or may be included in the edge device 300.

The pre-processing unit 303 performs trimming, target area identification, inversion, and correction of image data obtained by the photodetector 301. Examples of the correction include averaging, and correction of brightness and contrast. Further, edge enhancement may be performed.

During training in the training execution unit 250, a hyper parameter for controlling an algorithm of machine learning may be additionally managed.

The post-processing unit 304 can include inspection pass/fail information and production line information.

In the present exemplary embodiment, pre-processing and post-processing can be managed in combination in the system that manages the trained model and the imaging condition. Thus, the inference accuracy can be further increased, and the reproducibility can be enhanced. Further, additional training during the training can also be performed. Furthermore, the post-processing unit 304 is added, and this can be utilized in annotation processing. Thus, the system can be connected with various management systems such as a supervisory control and data acquisition system and a manufacturing execution system.

Fifth Exemplary Embodiment

An edge device management system according to a fifth exemplary embodiment will be described with reference to FIG. 8. The system according to the fifth exemplary embodiment is different from the system according to the first exemplary embodiment in that an edge device 300 includes an illumination device 305 and a robot 306, and an integrated management apparatus 200 manages not only an imaging condition but also conditions for movements of units other than a photodetector 301. Configurations except for configurations described below are similar to those of the first exemplary embodiment, and thus the description thereof may be omitted.

FIG. 8 illustrates a conceptual diagram of a case where the edge device management system is used as an inspection application. The management system includes the photodetector 301, the illumination device 305, the robot 306, and a production line 600.

The edge device 300 inspects a work flowing on the production line 600. The photodetector 301 of the edge device 300 images the work. The illumination device 305 irradiates an imaging range of the photodetector 301 with light. Based on image data from the edge device 300, the integrated management apparatus 200 performs pass/fail determination for the work. The robot 306 moves a work determined as having a defect from the production line 600.

The inspection of the work involves various conditions to be met by the configurations, such as an operation speed of the production line 600, an illumination intensity, an angle, and a color temperature of the illumination device 305, and a movable range, an operation angle, and an angular velocity of the robot 306. At least one of these conditions is managed in the integrated management apparatus 200. When a trained model is delivered from the integrated management apparatus 200 to the edge device 300, these conditions are also delivered in addition to an imaging condition, so that imaging can be performed with accuracy. Further, the dead time can be reduced in a process of inspecting a work by integrally managing the movable range and the operation speed of the robot 306.

The matters described in the first to fifth exemplary embodiments can be combined as appropriate.

The first exemplary embodiment in which the same work is inspected using the plurality of edge devices may be adopted for a predetermined period, and the second exemplary embodiment in which each edge device inspects a different work may be adopted for another period. In other words, the edge devices do not always inspect the same work, and the work and the condition to be selected can be changed as appropriate depending on the period.

Further, in the first to fifth exemplary embodiments, the photodetector 301 is described to be the image sensor, and the integrated management apparatus 200 is described to manage the trained model and the imaging condition, but the condition is not limited to the imaging condition. A condition such as an image parameter in FIG. 7 may be managed in association with the trained model. Furthermore, in a case where the photodetector 301 is a range-finding sensor, a condition such as a pulse interval for measuring a distance can be delivered together with the trained model.

In the present exemplary embodiments, the inference accuracy in the edge device can be improved.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-052544, filed Mar. 24, 2020, and Japanese Patent Application No. 2021-008444, filed Jan. 22, 2021, which are hereby incorporated by reference herein in their entirety.

What is claimed is:

1. A system comprising:
edge devices; and
an integrated management apparatus configured to manage the edge devices,
wherein each of the edge devices includes a photodetector,
wherein the integrated management apparatus manages a first trained model and a first condition in association with each other, and manages a second trained model and a second condition in association with each other, each of the first and second conditions setting an imaging condition for a photodetector, used in generating a corresponding one of the first and second trained model, each of the first and second trained models having been trained to inspect a work and to provide an inspection result of the work based on an image output from the photodetector which has captured the image of the work,
wherein the integrated management apparatus is configured to deliver the first trained model and the first condition to an edge device selected from the edge devices, and to deliver the second trained model and the second condition to an edge device selected from the edge devices, and
wherein the one or more edge devices include a first edge device and a second edge device,
wherein the first trained model and the first condition are delivered from the integrated management apparatus to the first edge device,
wherein the second trained model and the second condition are delivered from the integrated management apparatus to the second edge device,
wherein the first trained model and the second trained model are trained models based on a same target, and
wherein the first condition and the second condition are different imaging conditions.

2. The system according to claim 1,
wherein the photodetector is an image sensor, and
wherein the first trained model is generated based on an image obtained from the image sensor of the first edge device.

3. The system according to claim 2,
wherein the integrated management apparatus includes a first container that manages the first trained model and the first condition, and
wherein the first container is delivered to at least one of the one or more edge devices.

4. The system according to claim 3, wherein a machine learning library is not included in the first container.

5. The system according to claim 1,
wherein the integrated management apparatus includes a training execution unit, and
wherein an image obtained from the first edge device is transmitted to the training execution unit, and the first trained model is generated in the training execution unit.

6. The system according to claim 5,
wherein the integrated management apparatus includes a first database and a second database,
wherein the first database manages a plurality of trained models including the first trained model and the second trained model, and wherein the second database manages a plurality of conditions including the first condition and the second condition.

7. The system according to claim 5,
wherein the training execution unit inputs the trained model to a trained model database via a post-processing unit, and
wherein the post-processing unit manages a parameter for pass/fail determination.

8. The system according to claim 1, wherein the first trained model and the first condition are managed in association with each other in a relational database.

9. The system according to claim 1, further comprising a production line, wherein the first condition includes an operation speed of the production line.

10. The system according to claim 9, further comprising a robot, wherein the robot moves a work determined as having a defect by the first trained model.

11. The system according to claim 1, wherein the first imaging condition is at least one of an exposure time, a gain, an International Organization for Standardization (ISO) sensitivity setting, an F-number setting, a presence/absence of a high dynamic range, and a white balance adjustment.

12. A system comprising:
edge devices; and
an integrated management apparatus configured to manage the edge devices,
wherein each of the edge devices includes a photodetector,
wherein the integrated management apparatus manages a first trained model and a first condition in association with each other, and manages a second trained model and a second condition in association with each other, each of the first and second conditions setting an imaging condition for a photodetector, used in generating a corresponding one of the first and second trained model, each of the first and second trained models having been trained to inspect a work and to provide an inspection result of the work based on an image output from the photodetector which has captured the image of the work,
wherein the integrated management apparatus is configured to deliver the first trained model and the first condition to an edge device selected from the edge devices, and to deliver the second trained model and the second condition to an edge device selected from the edge devices, and
wherein the one or more edge devices include a first edge device and a second edge device,
wherein the first trained model and the first condition are delivered from the integrated management apparatus to the first edge device,
wherein the second trained model and the second condition are delivered from the integrated management apparatus to the second edge device,
wherein the first trained model and the second trained model are trained models based on different targets, and
wherein the first condition and the second condition are a same imaging condition.

13. The system according to claim 12, wherein the first imaging condition is at least one of an exposure time, a gain, an International Organization for Standardization (ISO) sensitivity setting, an F-number setting, a presence/absence of a high dynamic range, and a white balance adjustment.

14. A system comprising:
edge devices; and
an integrated management apparatus configured to manage the edge devices,
wherein each of the edge devices includes a photodetector,
wherein the integrated management apparatus manages a first trained model and a first condition in association with each other, and manages a second trained model and a second condition in association with each other, each of the first and second conditions setting an imaging condition for a photodetector, used in generating a corresponding one of the first and second trained model, each of the first and second trained models having been trained to inspect a work and to provide an inspection result of the work based on an image output from the photodetector which has captured the image of the work,
wherein the integrated management apparatus is configured to deliver the first trained model and the first condition to an edge device selected from the edge devices, and to deliver the second trained model and the second condition to an edge device selected from the edge devices, and
wherein the one or more edge devices include a first edge device and a second edge device,
wherein the first trained model and the first condition are delivered from the integrated management apparatus to the first edge device,
wherein the second trained model and the second condition are delivered from the integrated management apparatus to the second edge device,
wherein the first trained model and the second trained model are trained models based on different targets, and
wherein the first condition and the second condition are different imaging conditions.

15. The system according to claim 14, wherein the first imaging condition is at least one of an exposure time, a gain, an International Organization for Standardization (ISO) sensitivity setting, an F-number setting, a presence/absence of a high dynamic range, and a white balance adjustment.

* * * * *